United States Patent [19]

O'Hara et al.

[11] 4,028,273

[45] June 7, 1977

[54] METHOD OF CATALYST MANUFACTURE

[75] Inventors: Mark J. O'Hara, Mount Prospect, Ill.; William K. T. Gleim, Seattle, Wash.

[73] Assignee: UOP Inc., Des Plaines, Ill.

[22] Filed: Oct. 15, 1975

[21] Appl. No.: 622,580

Related U.S. Application Data

[63] Continuation-in-part of Ser. No. 450,630, March 13, 1974, abandoned.

[52] U.S. Cl. .................................. 252/432; 208/216
[51] Int. Cl.² .......................................... B01J 21/02
[58] Field of Search ..................................... 252/432

[56] References Cited

UNITED STATES PATENTS 3,637,525   1/1972   O'Hara ............................. 252/432
3,640,817   2/1972   O'Hara ............................. 252/432

*Primary Examiner*—Patrick P. Garvin
*Attorney, Agent, or Firm*—James R. Hoatson, Jr.; Robert W. Welch; William H. Page, II

[57] ABSTRACT

A method of manufacturing a catalytic composite of a Group VIII metal, a Group VIB metal and a refractory inorganic oxide-boron phosphate carrier material. A refractory inorganic oxide hydrogel is perecipitated from an aqueous solution, impregnated with an aqueous solution of boric and phosphoric acids, admixed with preformed, refractory inorganic oxide-boron phosphate fines, and the mixture recovered by filtration. The mixture is then dried, and further impregnated with a metal of Group VIII and a metal of Group VIB. The resulting composite is then dried and calcined.

10 Claims, No Drawings

METHOD OF CATALYST MANUFACTURE

CROSS-REFERENCE TO RELATED APPLICATIONS

This application is a continuation-in-part of a copending application Ser. No. 450,630, filed Mar. 13, 1974 now abandoned.

This invention relates to a method of manufacturing a catalytic composite particularly adapted to the hydrorefining of residual oils. Residual oils are the liquid or semi-liquid products recovered as a non-distillable bottoms fraction or residue in the distillation of petroleum. The residual oils are high carbonaceous refractory materials variously referred to as asphaltum oil, liquid asphalt, black oil, petroleum tailings, residuum, residual reduced crude, vacuum bottoms, and the like. In general, the hydrorefining or hydrotreating of residual oils is designed for the conversion of heptane-insoluable asphaltenes and other hydrocarbonaceous matter to more valuable distillable petroleum products, and/or the conversion and separation of sulfurous components to render the residual oil useful, for example, as a fuel oil.

The sulfurous components can be reduced to an acceptable level at hydrorefining conditions whereby they are converted to hydrogen sulfide and readily separated as gaseous products. The reduction of heptane-insoluble asphaltenes is substantially more difficult. The heptane-insoluable asphaltenes which occur in residual oils comprise a significant fraction thereof. These compounds tend to deposit within a reaction zone and on the catalyst situated therein forming a gummy hydrocarbonaceous residue which functions as a coke precursor. The deposition of this residue constitutes a significant loss of product and it is economically desirable to convert such asphaltenes into useful hydrocarbon fractions.

The hydrorefining process herein contemplated affords the advantage of converting heptane-insoluble asphaltenes into heptane-soluble hydrocarbons. The catalytic composite of this invention effects said conversion at hydrorefining conditions without incurring a relatively rapid deposition of coke and other hydrocarbonaceous matter. Further, depending upon process conditions and the character of the residual oil being processed, a substantial portion of the feed stock can be simultaneously hydrocracked to yield gasoline, kerosine, fuel oil or other valuable liquid products.

It is an object of this invention to present an improved method of catalyst manufacture. It is a further object to provide a method of manufacturing a catalyst of improved activity and stability, particularly with respect to the hydrorefining of residual oils.

In one of its broad aspects, the present invention embodies a method of manufacturing a catalytic composite consisting essentially of a Group VIII metal and a Group VIB metal composited with a refractory inorganic oxide-boron phosphate carrier material which comprises: precipitating an inorganic oxide hydrogel from a hydrosol of at least one inorganic oxide selected from the group consisting of alumina, silica, zirconia, thoria and boria; impregnating the resulting mixture with an aqueous solution containing sufficient boric and phosphoric acids to provide a catalytic composite comprising from about 13 to about 35 wt. % boron phosphate; admixing the thus impregnated hydrogel with a dried, finely divided form thereof in an amount to provide from about 5 to about 50 wt. % of said catalytic composite; drying the resulting mixture and further impregnating the same with a decomposable compound of a metal of Group VIII and a decomposable compound of a metal of Group VIB in amounts sufficient to incorporate from about 0.1 to about 10 wt. % Group VIII metal and from about 5 to about 20 wt. % Group VIB metal into said catalytic composite; and drying and calcining the resulting composite.

A more specific embodiment of this invention relates to a method of manufacturing a catalytic composite consisting essentially of from about 0.1 to about 10 wt. % Group VIII metal and from about 5 to about 20 wt. % Group VIB metal composited with an alumina-silica-boron phosphate carrier material, which method comprises precipitating an alumina-silica cogel from a silica sol commingled with a soluble alumina salt; impregnating the resulting mixture with an aqueous solution containing sufficient boric and phosphoric acids to provide a catalytic composite comprising from about 13 to about 35 wt. % boron phosphate; admixing the thus impregnated hydrogel with a finely divided form thereof, dried at a temperature of from about 215° to about 415° F., in am amount to provide from about 20 to about 40 wt. % of said catalytic composite; drying the resulting mixture at a temperature of from about 215° to about 415° F., and further impregnating the same with a decomposable compound of a metal of Group VIII and a decomposable compound of a metal of Group VIB in amounts sufficient to incorporate from about 0.1 to about 10 wt. % Group VIII metal and from about 5 to about 20 wt. % Group VIB metal into said catalytic composite; and drying and calcining the resulting composite in an oxidizing atmosphere at a temperature of from about 700° to about 1200° F.

A still more specific embodiment of the present invention concerns a method of manufacturing a catalytic composite consisting essentially of from about 0.1 to about 10 wt. % nickel and from about 5 to about 20 wt. % molybdenum composited with an alumina-silica-boron phosphate carrier material, which method comprises precipitating an alumina-silica cogel with a pH in excess of about 7.9 and in a weight ratio of from about 1.5:1 to about 9:1 from a hydrosol comprising a silica sol commingled with aluminum sulfate; impregnating the resulting mixture with an aqueous solution containing sufficient boric and phosphoric acids to provide a catalytic composite comprising from about 13 to about 35 wt. % boron phosphate; admixing the thus impregnated hydrogel with a finely divided form thereof, dried at a temperature of from about 215° to about 415° F., in an amount to provide from about 20 to about 40 wt. % of said catalytic composite; drying the resulting mixture at a temperature of from about 215° to about 415° F., and further impregnating the same with a decomposable compound of nickel and a decomposable compound of molybdenum in amounts sufficient to incorporate from about 0.1 to about 10 wt. % nickel and from about 5 to about 20 wt. % molybdenum in said catalytic composite; and drying and calcining the resultant composite in an oxidizing atmosphere at a temperature of from about 700° to about 1200° F.

Other objects and embodiments of this invention will become apparent in the following detailed specification.

In accordance with the method of manufacture of this invention the refractory inorganic oxide-boron phosphate carrier material is first prepared as an inorganic oxide hydrogel. Inorganic oxide hydrogels which, upon subsequent high temperature calcination, yield refractory inorganic oxides suitable for use herein, include the hydrogels of alumina, silica, zironia, thoria, boria, and the like, or composites thereof, particularly alumina composited with silica in a weight ratio of from about 1.5:1 to about 9:1, and preferably in a weight ratio of from about 1.5:1 to about 3:1. Alumina and silica can be prepared as a cogel by commingling an aqueous water glass solution with an aqueous solution of aluminum sulfate, or other suitable aluminum salt, and the mixture admixed with an alkaline precipitating agent, for example ammonium hydroxide, to effect cogelation of the alumina and silica. Preferably, the alumina and silica, or other gel or cogel, is precipitated at a pH in excess of about 7.9, suitably at a pH of from about 8 to about 10 or more. In any case, the resulting hydrogel is water washed substantially free of sodium ions and, where the aluminum salt employed is aluminum sulfate, sulfate ions.

In the preparation of the refractory inorganic oxide-boron phosphate carrier material, it is a preferred practice to impregnate said hydrogel with boric and phosphoric acids by admixing a common aqueous solution of said acids with said hydrogel, and recovering the impregnated hydrogel from the resulting slurry by filtration. Thus, the inorganic oxide hydrogel is slurried with sufficient boric and phosphoric acids to provide a finished catalyst comprising from about 13 to about 35 wt. % boron phosphate. The boric and phosphoric acids are suitably employed in about a 1:1 molar ratio.

Filtration of the hydrogel slurry is greatly facilitated by the addition thereto of the finely divided inorganic oxide, the addition being preferably subsequent to the addition of the boric and phosphoric acids thereto as heretofore described. Thus, the finely divided inorganic oxide not only improves the activity and stability of the catalyst product, but also expedites the manufacturing process. The finely divided inorganic oxide admixed with said hydrogel slurry is preferably a dried and/or calcined form of said hydrogel such as is produced in the subsequent drying and/or calcination thereof. As a practical matter, the finely divided inorganic oxide is comprised of fines produced in the handling or processing of the dried and/or calcined inorganic oxide hydrogel prior to impregnation with the Group VIB and Group VIII metal components. It will be appreciated that said fines will at this stage include boron phosphate. The inorganic oxide, preferably finely ground to pass through a 200 mesh sieve, is effective in amounts ranging from about 5 to about 50 wt. % based on the weight of the finished product.

The resulting composite may be recovered as a wet filter cake and formed into particles of desired shape and size. Thus, the filter cake may be dried, preferably at a temperature of from about 215° to about 415° F., and broken into granules of irregular shape, or the wet filter cake may be formed into extrudate particles of desired size and dried at said temperature. Binders such as starch, polyvinyl alcohol, methylcellulose, graphite, etc., may be employed if so desired, suitably in a concentration of from about 1 to about 5 wt. % of the extrudable mass. The dried composite, utilized as a support or carrier material for the Group VIB and Group VIII metal components, may be further calcined at a temperature of from about 700° to about 1200° F. prior to the addition of said components thereto, although it is preferred to avoid high temperature calcination at this stage of the manufacturing process.

As previously mentioned, the hydrogel portion of the carrier material is precipitated at a pH in excess of about 7.9, suitably at a pH of from about 8 to about 10 or more. It has been found that the pH at which precipitation occurs is a contributing factor to the development of desirable pore volume-pore diameter characteristics of the carrier material — it being desirable to maximize the pore volume associated with pores having an average diameter of from about 100 to about 500 Angstroms. This is particularly evident when the hydrogel is the preferred alumina-silica cogel. The preferred pH range may be maintained in any manner which achieves the desired result. For example, in the preparation of the alumina-silica cogel, the aqueous water glass-aqueous aluminum sulfate mixture may be admixed with an excess quantity of ammonium hydroxide such that the final pH is about 8 or more. In any case, in the subsequent water-washing of the hydrogel prior to slurrying the same with the aqueous boric and phosphoric acid solution, it is advantageous to continue said washing until the washings exhibit a substantially neutral pH. It has been observed that the boron phosphate component of the carrier material tends to complex with any residual ammonium ions in the hydrogel rather than the hydrogel itself. The intended effect of boron phosphate in the catalyst composite is thereby somewhat obviated.

While the boron phosphate component of the carrier material will function to reduce coke deposit on and in the catalyst particles under hydrorefining conditions, its principal contribution is considered to be its beneficial effect on the pore volume-pore diameter characteristics of said particles.

The catalyst composite of this invention comprises a metal of Group VIB and a metal of Group VIII composited with the carrier material. Thus, the catalyst may comprise chromium, molybdenum and/or tungsten in combination with one or more metals of Group VIII, i.e., iron, nickel, cobalt, platinum, palladium, ruthenium, rhodium, osmium and iridium. Of the Group VIB metals, molybdenum is preferred. The Group VIB metal is suitably employed in an amount to comprise from about 5 to about 20 wt. % of the final catalyst composite. The Group VIII metal, which is preferably nickel, is suitably effected in amounts to comprise from about 0.1 to about 10 wt. % of the final catalyst composite. The Group VIB and the Group VIII metal component may be composited with the carrier material in any suitable manner. For example, the carrier material can be soaked, dipped, suspended or otherwise immersed in a common solution comprising a suitable decomposable compound of a Group VIB metal and a suitable decomposable compound of a Group VIII metal. Alternatively, a Group VIB metal and a Group VIII metal may be composited with the carrier material utilizng individual solutions thereof and in any convenient sequence. Suitable compounds of Group VIB metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Compounds of metals of Group VIII which are suitable include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric chloride, ferric nitrate, ferric sulfate, ferric formate, ferric acetate, platinum chloride, chloroplatinic acid, chloropalladic acid, palladium chloride, etc.

The final catalyst composite, after all of the catalytic components are present therein, is usually dried for a period of from about 1 to about 4 hours or more in a steam dryer, than at from about 205°0 to about 260° F. in a drying overn. The dried catalyst composite is thereafter oxidized in an oxygen-containing atmosphere, such as air, for a period of from about 1 to about 8 hours or more and at a temperature of from about 700° to about 1200° F. The catalyst composite is preferably oxidized to a stable state, e.g. until the catalyst composite retains a constant weight, to realize maximum hydrorefining activity.

The hydrorefining process, utilizing the catalyst prepared in accordance with the method of the present invention, is effected by reacting the petroleum crude oil, or residual oil, and hydrogen in contact with said catalyst. The charge stock and hydrogen mixture is heated to an operating temperature within the range of from about 435° to about 930° F., and contacts the catalyst under an imposed pressure of from about 500 to about 5000 psig. The total reaction zone product effluent is passed into a suitable high pressure-low temperature separator from which a gaseous phase rich in hydrogen is removed and recycled to combine with fresh hydrocarbon charge. The remaining normally liquid product effluent is then introduced into a suitable fractionator or stripping column for the purpose of removing hydrogen sulfide and light hydrocarbons including methane, ethane, and propane. Although the normally gaseous phase from the high pressure separator may be treated for the purpose of removing the ammonia formed as a result of the destructive removal of introgenous compounds, a more convenient method involves the introduction of water upstream from the high pressure separator, and removing said water and absorbed ammonia via suitable liquid level control means disposed in said pressure separator.

The following examples are presented in illustration of one preferred embodiment of this invention and are not intended as an undue limitation on the generally broad scope of the invention as set out in the appended claims.

The activity of the catalyst prepared in accordance with the method of this invention was determined relative to the activity of a standard or a reference catalyst. The relative activity of the catalyst was determined with respect to the conversion of heptane-insoluble asphaltenes contained in a vacuum tower bottoms feed stock, as a function of liquid hourly space velocity (LHSV). The vacuum tower bottoms feed stock had an API at 60° F. of 9.6, and contained 0.39 wt. % nitrogen, 3.3 wt. % sulfur and 5.7 wt. % heptane-insoluble asphaltenes. The feed stock further contained 10.56 wt. % hydrogen and 25.5 wt. % was recovered as bottoms after vacuum Engler distillation.

In the relative activity test, 150 cubic centimeters of the catalyst to be evaluated is disposed in a 7/8 inch I.D. vertical tubular reactor as a fixed bed comprising alternating layers of 10 cubic centimeters of catalyst and 2 cubic centimeters of 60–80 mesh sand, the catalyst bed being preceded by a quartz chip preheat section. The reactor is pressured to 3000 psig with hydrogen, and the hydrogen is recycled over the catalyst at the rate of 15,000 SCF/BBL (based on a 1.0 LHSV hydrocarbon charge rate) while the catalyst inlet temperature is raised to 260°0 C. The vacuum tower bottoms feed stock is charged to the reactor at 1.0 LHSV for 2 hours after which the catalyst inlet temperature is raised at the rate of 30° per hour to a temperature of 380° C. After a 27-hour line-out period the liquid product effluent is collected over an 8-hour test period. The charge rate is thereftet reduced to 0.5 LHSV and, after an 8-hour line-out period, the liquid product effluent is again collected over an 8-hour test period. In each test period, the liquid product effluent is analyzed for heptane-insoluble asphaltenes.

The analytical results are plotted on a semi-logarithmic scale as a function of a LHSV employed. The slope of the resulting straight line is then utilized to determine the activity of the test catalyst relative to the standard or reference catalyst, the ratio of the slope from the test catalyst to that of the standard or reference catalyst (multiplied by a factor of 100) being the relative activity of the catalyst tested. It will be appreciated that a test catalyst with a relative activity in excess of 100 is more active than the standard or reference catalyst.

EXAMPLE I

The standard or reference catalyst employed herein consisted of 2 wt. % nickel and 16 wt. % molybdenum on an alumina-silica-boron phosphate carrier material comprising 68 wt. % alumina, 10 wt. % silica and 22 wt. % boron phosphate. In the preparation of the standard or reference catalyst, 382 grams of water glass diluted with 760 ml $H_2O$ was acidified with 100 milliliters of concentrated hydrochloric acid diluted with 200 milliliters of water. The resulting hydrosol was commingled with 8.7 liters of an aqueous aluminum sulfate solution containing 2280 grams of aluminum sulfate. The mixture was then added to 3.5 liters o concentrated ammonium hydroxide diluted with 3.5 liters of water to precipitate a hydrogel, the final pH being 9.4. The hydrogel product was recovered by filtration and water-washed substantially free of sodium, sulfate and ammonium ions. The washed hydrogel product was thereafter slurried in an aqueous solution of 238 grams of 85.5% phosphoric acid and 123 grams of boric acid at 160° F. The resulting composite, recovered by filtration and dried at about 250° F., was ground to 10–30 mesh particle size. About 122 grams of the particles were subsequently impregnated with a solution prepared by dissolving 37 grams of molybdic acid (85% $MoO_2$) and 13 grams of nickel nitrate hexahydrate in about 230 milliliters of an aqueous ammoniacal solution. The impregnated particles were dried, heated to 1100 ° F. in amuffle oven, and calcined in air at this temperature for about 1 hour. The catalyst product contained 2 wt. % nickel, 16 wt. % molybdenum and has an average bulk density of 0.31 grams per cubic centimeter.

EXAMPLE II

The catalyst of this example was prepared subsantially as described in the previous example except that the nickel and molybdenum impregnated particles were dried and calcined in air for 3 hours at 1100° F. until the catalyst particles had attained a constant weight. The catalyst particles of this example had a relative activity of 130.

EXAMPLE III

In the preparation of the catalyst of this invention, 382 grams of water glass diluted with 760ml $H_2O$ was acidified with 100 milliliters of concentrated hydrochloric acid diluted with 200 milliliters of water. The resulting hydrosol was commingled with 8.7 liters of an aqueous aluminum sulfate solution containing 2280 grams of aluminum sulfate. The mixture was then added to 3.5 liters of concentrated ammonium hydroxide diluted with 3.5 liters of water to precipitate a hydrogel, the final pH being 09.4. About 359 grams (288 grams on a calcined basis) of finely divided (<200 mesh) alumina-silica-boron phosphate composite recovered as fines in the manufcture of the alumina-silica-boron phosphate support of Examples I and II, and comprising 68 wt. % alumina, 10 wt. % silica and 22 wt. % boron phosphate, was admixed with the hydrogel, and the resulting mixture was recovered by filtration. The mixture was water-washed substantially free of sodium, sulfate and ammonium ions. The washed mixture was thereafter slurried in an aqueous solution of 238 grams of 85.5% phosphoric acid and 128 grams of boric acid at 160° F. The resulting composite, recovered by filtration and dried at 250° F., contained 68 wt. % alumina, 10 wt. % silica and 22 wt. % boron phosphate. About 122 grams of the composite, ground to a 10-30 mesh particle size, was subsequently impregnated with a solution prepaed by dissolving 37 grams of molybdic acid (85% $MoO_3$) and 13 grams of nickle nitrate hexahydrate in about 230 milliliters of an aqueous ammoniacal solution. The impregnated particles were dried, and calcined in air for 3 hours at 1100° F. until the catalyst particles had obtained a constant weight. The catalytic composite thus prepared consisted of 2 wt. % nickel and 16 wt. % molybdenum impregnated on a support comprising 68 wt. % alumina, 10 wt. % silica and 22 wt. % boron phosphate. The catalytic composite, with an average bulk density of 0.34 grams per cubic centimeter, had a relative acitvity of 163.

It will be observed that the catalytic composites of Examples I, II and III are of substantially the same composition, that is, 2 wt. % nickel and 16 wt. % molybdenum on a support comprising 68 wt. % alumina, 10 wt. % silica and 22 wt. % boron phosphate. It will be further observed that said catalytic composites were prepared in substantially the same manner, except that the catalytic composites of Examples II and III were calcined until they attained a constant weight, and with the further significant exception that the preparation of Example III embodied the innovative feature of the present invention herein described. It must therefore be concluded that the activity improvement demonstated by the catalytic composite of Example III is derived from the practice of this invention.

We claim as our invention:

1. In a method of manufacturing a catalytic composite consisting essentially of a Group VIII metal and a Group VIB metal composited with a refractory inorganic oxide-boron phosphate carrier material, the steps of:
   a. precipitating in inorganic oxide hydrogel from a hydrosol of at least one inorganic oxide selected from the group consisting of alumina, silica, zirconia, thoria, and boria;
   b. admixing the inorganic oxide hydrogel with a dried, finely divided form thereof in an amount to provide from about 5 to about 50 wt. % of said catalytic composite;
   c. impregnating the resulting mixture with an aqueous solution containing sufficient boric and phosphoric acids to provide a catalytic composite comprising from about 13 to about 35 wt. % boron phosphate;
   d. drying the resulting mixture and further impregnating the same with a decomposable Group VIII metal compound and a decomposable Group VIB metal compound in amounts sufficient to incorporate from about 0.1 to about 10 wt. % Group VIII metal and from about 5 to about 20 wt. % Group VIB metal into said catalytic composite; and
   e. drying and calcining the resultant mixture in an oxidizing atmosphere.

2. The method of claim 1 further characterized with respect to step (a) in that said inorganic oxide hydrogel is an alumina-silica cogel precipitated from a silica sol commingled with a soluble aluminum salt.

3. The method of claim 1 further characterized with respect to step (a) in that said inorganic hydrogel is an alumina-silica cogel precipitated at a pH in excess of about 7.9 from a silica sol commingled with a soluble aluminum salt.

4. The method of claim 1 further characterized with respect to step (a) in that said inorganic oxide hydrogel is an alumina-silia cogel comprising alumina and silica in a weight ratio of from about 1.5:1 to about 9:1.

5. The method of claim 1 further characterized with respect to step (a) in that said dried, finely divided form of said hydrogel was previously dried at a temperature of from about 215° to about 415° F.

6. The method of claim 1 futher characterized with respect to step (a) in that said dried, finely divided form of said hydrogel is utilized in an amount to provide from about 20 to about 40 wt. % of said catalytic composite.

7. The method of claim 1 further characterized with respect to step (d) in that said drying is effected at a temperature of from about 215° to about 415° F.

8. The method of claim 1 further characterized with respect to step (d) in that said Group VIII metal compound is a nickel compound.

9. The method of claim 1 further characterized with respect to step (d) in that said Group VIB metal compound is a molybdenum compound.

10. The method of claim 1 further characterized with respect to step (e) in that said calcining is effected at a temperature of from about 700° to about 1200° F.

* * * * *